Dec. 27, 1955 — C. C. SCHULTZ — 2,728,458
FILTERING CARTRIDGE AND SHIELD
Filed Aug. 18, 1951

INVENTOR.
CHARLES C. SCHULTZ
BY Hoodling and Krost
attys

Dec. 27, 1955    C. C. SCHULTZ    2,728,458
FILTERING CARTRIDGE AND SHIELD
Filed Aug. 18, 1951    2 Sheets-Sheet 2

INVENTOR.
CHARLES C. SCHULTZ
BY
Hoodling and Krost
attys

United States Patent Office 2,728,458
Patented Dec. 27, 1955

2,728,458

FILTERING CARTRIDGE AND SHIELD

Charles C. Schultz, Calgary, Alberta, Canada

Application August 18, 1951, Serial No. 242,478

5 Claims. (Cl. 210—148)

My invention relates to a repackable filter cartridge for use within a case in the process of elimination of sludge and such foreign matter from the oil used in lubrication of engines, with particular reference to internal combustion engines, and comprises such parts as will allow the filtering material contained therein to be ejected by hand for replacement with a fresh supply.

An object of my invention is the provision of a perforated shield slidably mounted in the perforated cartridge shell and circumferentially extending around the inner wall of the shell.

The advantage of my invention is that the shield and the filtering material therein, such as ordinary "waste," is slidably ejectable from the perforated cartridge shell, and the cartridge as a container for the "waste" is usable indefinitely, and is repackable with clean "waste" when necessary.

A further advantage is that the "waste" may be readily examined to ascertain that proper filtering is taking place without having to destroy the cartridge, as is the case with conventional oil filtering cartridges.

Another object of my invention is the provision of a perforated shield slidably mounted in the perforated cartridge, the perforated shield being corrugated and having alternate portions with perforations therein radially spaced from the inner wall of said shell.

Another object of my invention is the provision of a perforated shield slidably mounted in the perforated cartridge, the perforated shield having outwardly extending engagement portions contactable with the inner wall of said shell and supporting other portions of said shield with perforations therein radially from said inner wall.

Another object of my invention is the provision of a perforated shield slidably mounted in the perforated cartridge, the perforated shield having outwardly extending raised portions contactable with the inner wall of said shell and supporting other portions of said shield with perforations therein radially from said inner wall.

Another object of my invention is the provision of a perforated shield having the perforations thereof provided with jagged boundaries.

Other objects and a fuller understanding of my invention may be had by referring to the following description and claims, taken in conjunction with the accompanying drawings in which Figure 1 is a side elevational view of a filter and my repackable cartridge mounted therein, the view being shown in cross-section with parts broken away to better illustrate the invention;

Figure 1:
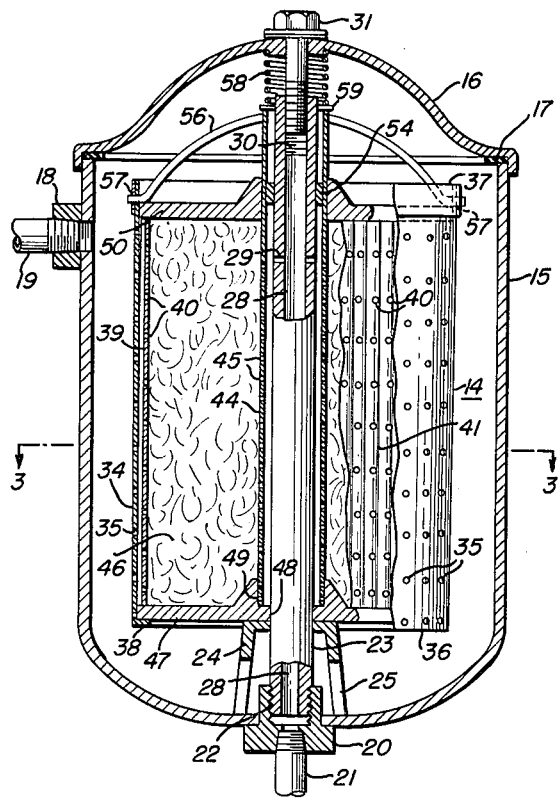
Figure 2:
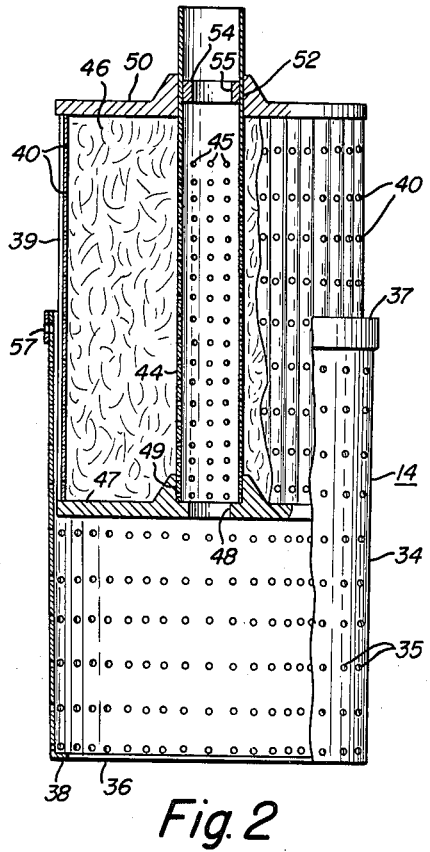
Figure 2 is a side elevational view of my repackable cartridge with the internal parts and filtering material being partially ejected.

With reference to Figure 1, my repackable cartridge is indicated generally by the reference character 14 and is adapted to be replaceably mounted in a filter having a casing 15 provided with a removable filter lid 16 at its upper end thereof. An annular gasket 17 is provided between the upper edge of the filter casing 15 and underneath the filter lid 16. Mounted on the left-hand side of the filter casing 15 is a threaded port 18 which may be secured through the side wall of the casing 15 in any suitable manner, such as by welding. A fluid conduit 19 is threadably connected to the threaded port 18.

Mounted in the bottom of the filter casing 15 is a threaded port 20 which may be suitably connected to the filter casing 15 by any suitable means such as, for example, by spot welding. A fluid conduit 21 is threadably connected to the threaded port 20. The fluid which is to be filtered flows through the fluid conduits 19 and 21. The inside of the threaded port 20 is provided with female threads 22 into which is threadably connected a central bolt 23. As illustrated in Figure 1, the central bolt is supported by a bracket 24 having legs 25 which extend downwardly and rest upon the inside bottom wall of the filter casing 15. The central bolt 23 is provided with a longitudinal duct 28 through which liquid to be filtered flows. The bolt 23 has side apertures 29 which provide fluid communication between the duct 28 and my repackable cartridge 14. The upper end of the bolt 23 is provided with female threads 30 into which a cap screw 31 fits for holding the filter lid 16 in place.

Figure 3:
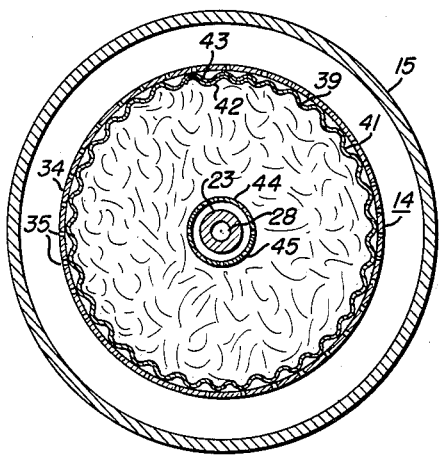
Figure 3 is the cross-sectional view taken along the line 3—3 of Figure 1.
Figure 4:
Figure 4 is a fragmentary view of the corrugated, perforated shield showing the provision of having the adjoining ends secured together, such, for example, as by a rivet or spot welding.

My repackable cartridge 14 comprises an outer annular shell 34 having a plurality of apertures 35 through which liquid may flow. The annular shell 34 has a bottom open end 36 and a top open end 37. The bottom open end of the annular shell is provided with an inwardly extending flange 38 upon which rests a bottom disk 47. Mounted within the annular shell 34 is a perforated shield 39 having a plurality of perforated holes 40. The perforated shield 39 rests on top of the bottom disk 47 and, when it is so placed, the perforated holes 40 of the perforated shield 39 are misaligned from the aperture 35 in the outer annular shell 34. The perforated shield 39 is, preferably, provided with corrugations 41 which space the perforated holes 40 in the perforated shield radially away from the inside wall of the annular shell 34. The perforated shield, preferably, has its adjoining ends 42 and 43 overlapping each other, as shown in Figure 3. The overlapping, corrugated ends are such that they tend to naturally interlock with each other, whereby it is, preferably, unnecessary to have the adjoining ends permanently secured together. However, in Figure 4, I show a fragmentary view of the adjoining ends of the corrugated shield secured together by a rivet 33 or by any other suitable means, such as spot welding.

The bottom disk 47 is provided with a centrally disposed socket 49 into which is mounted the lower end of a tubular element 44 having a plurality of fluid openings 45. The lower end of the tubular element 44 may be secured in the socket by any suitable means, such as firm press fit. The bottom disk 47, which rests upon the inwardly extending flange 38 at the bottom of the annular shell 34, supports the tubular element within the perforated shield 39 and the annular shell 34. The tubular element 44 and the inside wall of the perforated shield 39 provide an annular space 46 to receive the supply of filtering material which is, preferably, of the "waste." The bottom disk 47 is provided with a hole defined by a wall 48. The wall 48 makes a slidable seal connection with the central bolt 23, whereby the repackable cartridge may be slid over the bolt when being mounted within the filter casing. The upper end portion of the tubular element 44 is provided with an internal, annular seal 54 having an annular wall 55 which makes a slidable seal connection with the upper end portion of the central bolt. In other words, the wall 55 of the annular seal 54 and the wall 48 in the bottom disk 47 provide slidable seal connections with the bolt 23 on opposite sides of the side apertures 29 where fluid which is being filtered is caused to flow through the filtering material. The top open end 37 of the annular shell 34 is removably closed by a cover disk 50 which has a central opening 52 that slidably fits around tubular element 44. The cover disk 50 rests on top of the perforated shield and the filtering material. Any suitable means may be employed to hold the cover disk 50 in place, and as illustrated in Figure 1, this may be accomplished by anchoring the two ends of a bale 56 into anchoring holes 57 provided in the upper side wall of the annular shell 34. In removing the top cover disk it is only necessary to spring in the two ends of the bale 56 until they clear the anchoring holes 57, at which time the bale may be removed to unlock the cover disk.

In mounting the retractable cartridge into the filter casing 15, it was only necessary to remove the lid 16 and then slide the repackable cartridge over the central bolt 23, after which the lid 16 may be restored by tightening the cap screw 31. A spring 58 and a washer 59 may be interposed between the underneath side of the lid 16 and the top of the tubular element 44.

Figure 5:
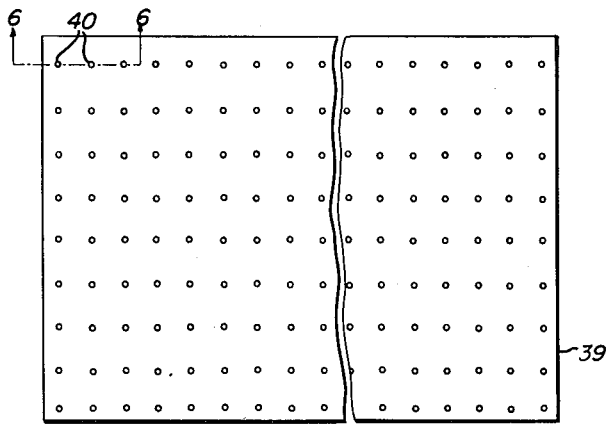
Figure 5 is a plan view of a perforated sheet of material which is adapted to be rolled into my perforated shield.
Figure 6:
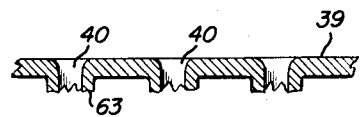
Figure 6 is an enlarged fragmentary cross-sectional view taken along the line 6—6 of Figure 5.
Figure 7:
Figure 7 is a side view of the perforated blank shown in Figure 5.
Figure 8:
Figure 8 is a side view of the perforated blank shown in Figure 5 after it has been corrugated.
Figure 9:
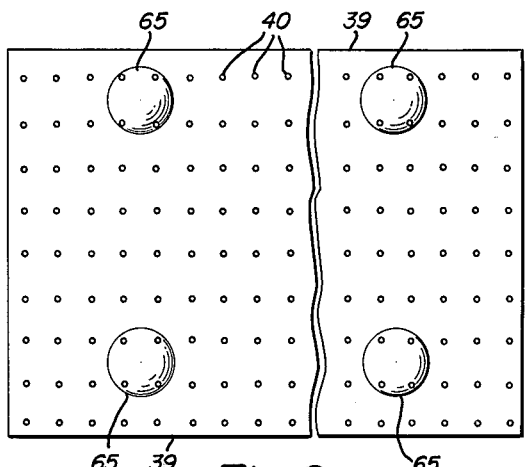
Figure 9 is a plan view of a modified perforated blank having bumps or raised portions to space the perforations of the shield from the cartridge shell.
Figure 10:
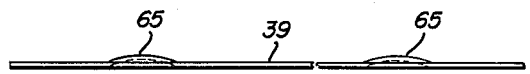
Figure 10 is a side view of the perforated blank shown in Figure 9.

In making the perforated shield 39, a blank piece of material, such as is shown in Figure 5, is first perforated while the piece is in flat form, such as shown in Figure 7. Next, the perforated sheet is corrugated, as shown in Figure 8, and then rolled into a shield, whereby it may slidably fit inside of the annular shell 34. The perforated shield 39, preferably, has the perforations thereof provided with jagged boundaries 63, such as shown in the enlarged, fragmentary cross-sectional view in Figure 6. The perforations are, preferably, made by pricking or punching a blank sheet of material with a tool which ruptures the metal and forms the holes 40 with jagged boundaries. One object of the jagged boundaries is that, in the event that a small piece of the waste of a thread-like nature should attempt to escape through the perforated holes 40, they are apt to be caught by the jagged boundaries to keep them from escaping out of the perforated holes 40. In the Figure 9, I show a piece of perforated material which may be rolled in circumferential form to constitute a modified shield. The modified shield is not corrugated, but is provided with a plurality of bumps or raised portions 65 which contactably engage the inner wall of the annular shell 34 and support other portions of the shield with perforations therein radially from the inner wall of the annular shell. The Figure 10 shows a side view of the piece of material in Figure 9 and illustrates the nature of the bumps 65. The piece of material, as shown in Figure 9, may be rolled into an annular shield and the adjoining ends may be either left disconnected or they may be joined by rivets or spot welding.

The annular shell 34 has a slightly larger diameter at the top end 37 than at the bottom end 36, producing a slightly tapering wall to facilitate the easy withdrawal of the shield 39 and the filtering material therefrom.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A repackable cartridge for a liquid filter, said repackable cartridge comprising an annular shell having a plurality of apertures through which liquid may flow, said annular shell having first and second open ends, a perforated shield slidably fitting within said shell and circumferentially extending around the inner wall of said shell, a tubular element having first and second end portions and disposed in said shield and shell and having means through which liquid may flow, said tubular element and said shield providing an annular space for filtering material, one of said end portions of the tubular element being open for connection to the filter for flow of liquid, ejectable means disposed at the first end portion of said tubular element and connected thereto for holding said shield and filtering material within the annular space at said first end of the annular shell, said ejectable means slidably fitting in said shell from said second end, stop means at the first end portion of the shell to arrest the movement of said ejectable means from sliding out of said first end, said stop means and ejectable means supporting said tubular element within said shell, a removable cover at the second end of the shell and holding the shield and filtering material in said shell at said second end, and readily operable means to removably hold said removable cover in place at said second end of the shell, said ejectable means being slidably ejectable from said shell in the direction of said first end to said second end and thereby forcing said shield and filtering material from said shell ahead of said ejectable means.

2. A repackable cartridge for a liquid filter, said repackable cartridge comprising an annular shell having a plurality of apertures through which liquid may flow, said annular shell having first and second open ends, a perforated shield slidably fitting within said shell and circumferentially extending around the inner wall of said shell, a tubular element having first and second end portions and disposed in said shield and shell and having means through which liquid may flow, said tubular element and said shield providing an annular space for filtering material, one of said end portions of the tubular element being open for connection to the filter for flow of liquid, ejectable means disposed at the first end portion of said tubular element and connected thereto for holding said shield and filtering material within the annular space at said first end of the annular shell, said ejectable means slidably fitting in said shell from said second end, stop means at the first end portion of the shell to arrest the movement of said ejectable means from sliding out of said first end, said stop means and ejectable means supporting said tubular element within said shell, a removable cover at the second end of the shell and holding the shield and filtering material in said shell at said second end, and readily operable means to removably hold said removable cover in place at said second end of the shell, said ejectable means being slidably ejectable from said shell in the direction of said first end to said second end and thereby forcing said shield and filtering material from said shell ahead of said ejectable means, said perforated shield being corrugated and having alternate portions with the perforations therein radially spaced from the inner wall of said shell.

3. A repackable cartridge for a liquid filter, said repackable cartridge comprising an annular shell having a plurality of apertures through which liquid may flow, said annular shell having first and second open ends, a perforated shield slidably fitting within said shell and circumferentially extending around the inner wall of said shell, a tubular element having first and second end portions and disposed in said shield and shell and having means through which liquid may flow, said tubular element and said shield providing an annular space for filtering material, one of said end portions of the tubular element being open for connection to the filter for flow of liquid, ejectable means disposed at the first end portion of said tubular element and connected thereto for holding said shield and filtering material within the annular space at said first end of the annular shell, said ejectable means slidably fitting in said shell from said second end, stop means at the first end portion of the shell to arrest the movement of said ejectable means from sliding out of said first end, said stop means and ejectable means supporting said tubular element within said shell, a removable cover at the second end of the shell and holding the shield and filtering material in said shell at said second end, and readily operable means to removably hold said removable cover in place at said second end of the shell, said ejectable means being slidably ejectable from said shell in the direction of said first end to said second end and thereby forcing said shield and filtering material from said shell ahead of said ejectable means, said perforated shield having outwardly extending engagement portions contactable with the inner wall of said shell and supporting other portions of said shield with perforations therein radially from said inner wall.

4. A repackable cartridge for a liquid filter, said repackable cartridge comprising an annular shell having a plurality of apertures through which liquid may flow, said annular shell having first and second open ends, a perforated shield slidably fitting within said shell and circumferentially extending around the inner wall of said shell, a tubular element having first and second end portions and disposed in said shield and shell and having means through which liquid may flow, said tubular element and said shield providing an annular space for filtering material, one of said end portions of the tubular element being open for connection to the filter for flow of liquid, ejectable means disposed at the first end portion of said tubular element and connected thereto for holding said shield and filtering material within the annular space at said first end of the annular shell, said ejectable means slidably fitting in said shell from said second end, stop means at the first end portion of the shell to arrest the movement of said ejectable means from sliding out of said first end, said stop means and ejectable means supporting said tubular element within said shell, a removable cover at the second end of the shell and holding the shield and filtering material in said shell at said second end, and readily operable means to removably hold said removable cover in place at said second end of the shell, said ejectable means being slidably ejectable from said shell in the direction of said first end to said second end and thereby forcing said shield and filtering material from said shell ahead of said ejectable means, said perforated shield having outwardly extending raised portions contactable with the inner wall of said shell and supporting other portions of said shield with perforations therein radially from said inner wall.

5. A repackable cartridge for a liquid filter, said repackable cartridge comprising an annular shell having a plurality of apertures through which liquid may flow, said annular shell having first and second open ends, a perforated shield slidably fitting within said shell and circumferentially extending around the inner wall of said shell, a tubular element having first and second end portions and disposed in said shell and having means through which liquid may flow, said tubular element being slidably mounted on and in spaced relationship with a central bolt hollowed and having a side-aperture for the passage of oil therethrough, said tubular element and said shield providing an annular space for filtering material, said end portions of the tubular element on opposite sides of said side-aperture, respectively, having a slidable seal connection with said central bolt, an ejectable means disposed at the first end portion of said tubular element and connected thereto for holding said shield and filtering material within the annular space at said first end of the annular shell, said ejectable means slidably fitting in said shell from said second end, stop means at the first end portion of the shell to arrest the movement of said ejectable means from sliding out of said first end, said stop means and ejectable means supporting said tubular element within said shell, a removable cover at the second end of the shell and holding said shield and filtering material in said shell at said second end, and readily operable means to removably hold said removable cover in place at said second end of the shell, said ejectable means being slidably ejectable from said shell in the direction of said first end to said second end and thereby forcing said shield and filtering material from said shell ahead of said ejectable means.

References Cited in the file of this patent

UNITED STATES PATENTS

| Number | Name | Date |
|---|---|---|
| Re. 23,604 | Schultz | Dec. 23, 1952 |
| 1,565,988 | Cottrell | Dec. 15, 1925 |
| 2,066,793 | Mesurac | Jan. 5, 1937 |
| 2,181,608 | Russell et al. | Nov. 28, 1939 |
| 2,271,054 | Williams | Jan. 27, 1942 |
| 2,337,238 | Griffith | Dec. 21, 1943 |
| 2,347,384 | Winslow et al. | Apr. 25, 1944 |
| 2,379,582 | Kracklauer | July 3, 1945 |
| 2,429,321 | La Brecque | Oct. 21, 1947 |
| 2,487,146 | Lasky | Nov. 8, 1949 |
| 2,562,735 | Pick | July 31, 1951 |